United States Patent
Verma et al.

(10) Patent No.: US 6,620,341 B1
(45) Date of Patent: Sep. 16, 2003

(54) CORROSION INHIBITORS FOR USE IN OIL AND GAS WELLS AND SIMILAR APPLICATIONS

(75) Inventors: Shyam Kumar Verma, Gastonia, NC (US); George Robert Sandor, Gastonia, NC (US)

(73) Assignee: FMC Corporation, Philadelphia, PA (US)

( * ) Notice: Subject to any disclaimer, the term of this patent is extended or adjusted under 35 U.S.C. 154(b) by 134 days.

(21) Appl. No.: 09/713,281

(22) Filed: Nov. 15, 2000

Related U.S. Application Data

(60) Provisional application No. 60/171,895, filed on Dec. 23, 1999.

(51) Int. Cl.$^7$ ................................................. C09K 3/00
(52) U.S. Cl. .................. 252/389.54; 507/269; 507/272; 507/275; 507/277; 507/939
(58) Field of Search ............... 252/389.54; 507/269, 507/272, 275, 277, 939

(56) References Cited

U.S. PATENT DOCUMENTS

| | | | | |
|---|---|---|---|---|
| 2,725,364 A | | 11/1955 | Dazzi | |
| 2,873,252 A | * | 2/1959 | Kohn | 252/389.54 |
| 2,885,359 A | * | 5/1959 | Frisius | 252/389.54 |
| 3,182,018 A | * | 5/1965 | Chittum | 252/389.54 |
| 3,227,518 A | | 1/1966 | Kennedy | |
| 3,424,601 A | | 1/1969 | Hamilton | |
| 3,478,530 A | | 11/1969 | Aronson | |
| 3,951,844 A | * | 4/1976 | Mago | 252/389.54 |
| 3,959,170 A | * | 5/1976 | Mago | 252/389.54 |
| 4,019,992 A | | 4/1977 | Krueger | |
| 4,077,929 A | | 3/1978 | Robinson | |
| 4,237,312 A | | 12/1980 | Stapp | |
| 4,250,042 A | | 2/1981 | Higgins | |
| 4,292,183 A | | 9/1981 | Sanders | |
| 4,304,677 A | | 12/1981 | Stauffer et al. | |
| 4,311,024 A | | 1/1982 | Itoh et al. | |
| 4,359,391 A | | 11/1982 | Salathiel et al. | |
| 4,414,125 A | | 11/1983 | Keil et al. | |
| 4,440,649 A | | 4/1984 | Loftin et al. | |
| 4,499,003 A | * | 2/1985 | Foroulis | 252/389.54 |
| 4,522,658 A | * | 6/1985 | Walker | 252/389.54 |
| 4,536,297 A | | 8/1985 | Loftin et al. | |
| 4,563,253 A | | 1/1986 | Leidheiser, Jr. et al. | |
| 4,612,378 A | | 9/1986 | Bosshard et al. | |
| 4,631,138 A | | 12/1986 | Johns et al. | |
| 4,650,594 A | | 3/1987 | Wu | |
| 4,664,193 A | | 5/1987 | Wu | |
| 4,740,320 A | | 4/1988 | Treybig et al. | |
| 4,816,303 A | | 3/1989 | Kroenke et al. | |
| 4,836,941 A | | 6/1989 | Thomas | |
| 4,963,290 A | | 10/1990 | Bressan et al. | |
| 4,980,074 A | | 12/1990 | Henson et al. | |
| 4,997,583 A | * | 3/1991 | Itzhak | 507/269 |
| 5,089,153 A | * | 2/1992 | Williams et al. | 252/389.54 |
| 5,101,888 A | | 4/1992 | Sprouse et al. | |
| 5,120,471 A | * | 6/1992 | Jasinski | 252/389.54 |
| 5,130,034 A | * | 7/1992 | Williams et al. | 507/269 |
| 5,152,929 A | | 10/1992 | Bentley et al. | |
| 5,188,179 A | | 2/1993 | Gay et al. | |
| 5,206,404 A | | 4/1993 | Gunkel et al. | |
| 5,354,507 A | | 10/1994 | De Malde et al. | |
| 5,441,929 A | | 8/1995 | Walker | |
| 6,004,475 A | * | 12/1999 | Verma et al. | 252/389.54 |
| 6,004,476 A | | 12/1999 | Verma et al. | |
| 6,024,892 A | * | 2/2000 | Verma et al. | 252/389.54 |
| 6,033,595 A | | 3/2000 | Verma et al. | |

FOREIGN PATENT DOCUMENTS

| | | |
|---|---|---|
| DE | 196 23 268 | 12/1996 |
| EP | 0 248 346 | 12/1987 |
| EP | 0 329 560 | 8/1989 |
| EP | 0 573 082 | 12/1993 |
| EP | 0 611 388 | 8/1994 |
| EP | 0 741 179 | 11/1996 |
| EP | 0 593 230 A1 | 3/2000 |
| FR | 2 505 861 | 11/1982 |
| JP | 58-224185 | 12/1983 |
| JP | 58-224187 | 12/1983 |
| JP | 59-93778 | 5/1984 |
| JP | 60-118785 | 6/1985 |
| JP | 1-174588 | 7/1989 |
| JP | 1-184287 | 7/1989 |
| JP | 2-85655 | 3/1990 |
| JP | 2-147689 | 6/1990 |
| JP | 7-138559 | 5/1995 |
| JP | 8-75292 | 3/1996 |
| WO | WO 97/49842 | 12/1997 |

OTHER PUBLICATIONS

Patent Abstracts of Japan vol. 007, No. 285 (C–201), Dec. 20, 1983 and JP 58 164792 A (Otsuka Kagaku Yakuhin KK) Sep. 29, 1983.

Pikel'nyi et al.; "The Kinetics and Mechanism of Corrosion in the Presence of Heteropolycompounds", Protection of Metals, vol. 30, No. 4, p. 385–386 XP000466629.

Lomakina et al.; "Heteropoly Anions as Corrosion Inhibitors for Aluminum in High Temperature Water," Werkstoffe Und Korrosion, vol. 46, No. 7, p. R111 XP000517821.

Japanese Patent Abstract 5228327 (1993).

K. Aramaki and H. Nishihara, *Fac. Sci. Technol.*, Keio Univ., Yokohama, 223, Japan 10(7):207–11 (1992).

Japanese Patent Abstract 6221728 (1994).

(List continued on next page.)

*Primary Examiner*—Philip Tucker
(74) *Attorney, Agent, or Firm*—Myers Bigel Sibley & Sajovec, PA

(57) ABSTRACT

Anti-corrosion additives and processes useful for oil drilling and similar applications. Heteropoly complex anions of transitional metal elements can be added to an oil well drilling solution which includes a metallic salt, optionally in combination with transition metal compounds or compounds of the metallic elements of Groups IIIa to VIa of the Periodic Table of Elements, to minimize corrosion of systems within which the solution is used.

35 Claims, No Drawings

OTHER PUBLICATIONS

Japanese Patent Abstract 2296888 (19909).

Chemical Abstracts, 74:106645, "Synthesis and some physiochemical properties of complex halides of lithium and antimony", Zimina et al. (1969).

Chemical Abstracts, 90:172469, "Protection of metals from corrosion in acid organic media", Basov et al. (1979).

Japanese Patent Abstract 59117577 (1984).

C. Simpson, "Second Generation Corrosion Inhibitors," *Polymer Paint Colour J.*, 185(4371),pp. 23–24 (1995).

Japanese Patent Abstract 59200769 (1984).

L. V. Tumurova, E.V. Kvashnina and M.V. Mokhosoev, Zashch. Met. 26(3), 437–9 (1990) (abstract only).

D.M. Brasher et al., "Sodium dodeca–Molybdophosphate as a Corrosion Inhibitor in Aqueous Solution", *Br. Corros. J.*, vol. 4, pp. 74–79, Mar., 1969.

A. Weisstuch et al., "An Electrochemical Study of Heteropoly Molybdates as Cooling Water Corrosion Inhibitors", *Corrosion–Nace*, vol. 28, No. 8, pp. 299–306, Aug., 1972.

Russian Patent Abstract 1685970 (1991).

L.E.Tsygankova et al., Zaschita Metallov 2777:344–347 (1991) (English Translation).

Tsygankova et al., "Protection of Steel by Hydroxyquinoline Films from Corrosion in Lithium Bromide Solutions," *Protection of Metals*, vol. 27, No. 2, Mar. 1, 1991, pp. 288–291.

JP 01 155 157 A, WPI/Derwent Abstract, Jun. 19, 1989.

Sastri et al., "Surface Analysis in Corrosion Inhibition Mechanisms," *Werkstoffe Und Korrosion*, vol. 39, No. 2, pp. 77–82, Feb., 1987, West Germany.

Granese et al., "The Inhibition Action of Heterocyclic Nitrogen Organic Compounds on Fe and Steel in HC1 media," *Corrosion Science*, vol. 33, No. 9, pp. 1439–1453, Sep., 1992, UK.

Chemical Abstracts, vol. 126, No. 3, Jan. 20, 1997, Columbus, Ohio, abstract No. 34170, Gorski et al.; "Brake Fluid" & PL 166 099 A.

Tanno et al., "The Corrosion of Carbon Steel in Lithium Bromide Solution at Moderate Temperatures," *Corrosion Science*, vol. 34, No. 9, pp. 1441–1451, Sep., 1993.

Chemical Abstracts, vol. 94, No. 10, Mar. 1981, p. 245, abstract No. 69499c, H.P. Batroff et al., "Inhibition of pitting corrosion by heteropoly acids," *Ann. Univ. Ferrara, Sez. 5 Suppl.*, 1980, 7 (vol. 4, Eur. Symp. Corros. Inhibitors, 5th), pp. 1103–1110.

Japanese Patent Abstract 5–214326, Aug., 1993.

Grant & Hackh's Chemical Dictionary, p. 282, definition of "heteropoly acids", 1987, no month available.

Chem. Ab. AN 121:25617, Pak et al., "Solid–Phase Redox Reaction of 12th Series Heteropoly Acids," 69(4), pp. 617–619, 1994, no month available.

* cited by examiner

CORROSION INHIBITORS FOR USE IN OIL AND GAS WELLS AND SIMILAR APPLICATIONS

CROSS-REFERENCE TO RELATED APPLICATIONS

The application is related to commonly owned provisional application Ser. No. 60/171,895, filed Dec. 23, 1999, which is incorporated herein by reference in its entirety, and claims the benefit of its earlier filing date under 35 USC 119(e).

FIELD OF THE INVENTION

This invention relates generally to corrosion inhibitors, and in particular to corrosion inhibitors and processes of using the same to protect metal surfaces in oil and gas drilling systems.

BACKGROUND OF THE INVENTION

Servicing fluids, also known as completion or packer fluids, are used in many oil and natural gas wells for a variety of purposes. Completion fluids used in oil and gas well drilling and similar applications in oilfields include drilling muds, brines, water, oil, and the like. Completion fluids can include inorganic salts, such as halides of zinc, calcium, sodium and other alkali elements, in concentrations ranging from trace amounts up to saturation.

Corrosion is recognized as a problem in the development of geoenergy sources, including oil and natural gas reserves, geothermal and geopressured systems. The corrosion problems are aggravated by the presence of acid gases such as hydrogen sulfide and carbon dioxide and by the co-production of brine solutions. For example, carbon steel is widely used in the construction of oil and gas wells in oilfields. While a useful material for such applications, carbon steel corrodes due to the presence of electrolytes and water in many servicing or completion fluids. In recent years, corrosion problems have become more severe as production from deeper, high pressure and high temperature wells has become more attractive, as these deeper formations can have increased levels of acid gas fluids.

Additives can provide corrosion protection for metals used in oil and gas drilling systems, such as carbon steel. However, conventional additives do not always provide the desired degree of corrosion protection, particularly at higher temperatures.

For example, corrosion inhibitors used in oil and gas drilling operations have typically included organic compounds containing nitrogen, sulfur and/or phosphorous. These corrosion inhibitors protect metal surfaces at least in part by forming a protective film on the metal surface. Thus, an important consideration for corrosion protection in oil and gas drilling systems is how well the corrosion inhibitor is transported to the corroding surface within the oil or gas well system. Dispersibility of the inhibitor in completion fluids, such as brine solutions, also plays an important role in its corrosion protection performance. Many other factors, such as stability of the protective film and inhibitor concentration in the completion fluid, are also important to provide enhanced corrosion protection. Many current inhibitors, however, have limited stability, particularly at higher temperatures, or exhibit poor characteristics in the solution and therefor offer limited protection.

SUMMARY OF THE INVENTION

The present invention provides corrosion protection for metal surfaces present in oil and gas well drilling systems.

One embodiment of the invention includes brine solutions useful in oil and gas well drilling systems and similar applications, for example, as completion fluids. In one aspect of this embodiment of the invention, the solutions include at least one heteropoly complex anion of transition metal elements as a corrosion inhibitor.

The invention also includes solutions that include a mixture of at least one heteropoly complex anion of transition metal elements with at least one additional corrosion inhibiting additive or agent. For example, the solution can include a mixture of at least one heteropoly complex anion of a transition metal element and at least one other transition metal compound as corrosion inhibitors. As another example, the solution can include a mixture of at least one heteropoly complex anion of a transition metal element and at least one compound of the metallic elements of the groups IIIa to VIa of the Periodic Table of Elements as corrosion inhibitors. Preferred compounds of the metallic elements of Group IIIa to VIa include halides of Group Va, and more preferably antimony halides, such as antimony bromide.

In another aspect of this embodiment of the invention, the solutions can include at least one compound of a metallic element of Group IIIa to VIa, and preferably of Group Va, of the Periodic Table of Elements. Exemplary compounds include without limitation oxides, sulfides, halides, nitrates, and the like, preferably halides, of metallic elements of Group IIIa to VIa. Preferably the solutions include halides, and more preferably antimony bromide ($SbBr_3$), as a corrosion inhibition additive.

The brine solutions of the invention containing the above noted corrosion inhibitors can provide improved corrosion protection for metal surfaces found in oil and gas drilling systems. The noted corrosion inhibiting additives can be stable in the solution phase, providing desired additive concentrations, stability and improved dispersibility. Still further, use of the solutions in oil and gas wells and other similar applications can result in a protective layer containing magnetite (iron oxide) formed on carbon steel. The inventors have found that a protective layer which forms as a result of using the solutions of the invention can be more corrosion resistant than the oxide layer formed in the presence of conventional corrosion inhibitors, such as lithium molybdate, in which magnetite film tends to be more amorphous and less developed. In addition the solutions of the invention can minimize or eliminate pitting of metal contacted with the brines. The solutions are particularly useful at high temperatures, approaching 550° F. and higher.

The present invention also provides processes for inhibiting corrosion metal surfaces present in oil and gas drilling systems and similar applications using the above noted corrosion inhibitors.

DETAILED DESCRIPTION OF THE PREFERRED EMBODIMENTS

The present invention will be described more fully hereinafter in connection with illustrative embodiments of the invention which are given so that the present disclosure will be thorough and complete and will fully convey the scope of the invention to those skilled in the art. However, it is to be understood that this invention may be embodied in many different forms and should not be construed as being limited to the specific embodiments described and illustrated herein. Although specific terms are used in the following description, these terms are merely for purposes of illustration and are not intended to define or limit the scope of the invention.

The present invention may be used to reduce the corrosive effects of brines upon metals, and is particularly useful for brines having a high concentration of metal halides, such as zinc halide, often used in oil and gas well drilling, production and storage. Metals which typically come into contact with the brines include iron, steel (including carbon steel) and other ferrous metals.

The solutions of the invention include any solution useful in oil and gas well drilling systems and in similar applications, such as solutions used in drilling, producing and storing oil and gas from subterranean earth formations. The solutions typically contain metal salts, such as but not limited to, transition metal salts, alkali metal salts, alkaline earth metal salts, and mixtures thereof. Exemplary salts include halides of zinc, calcium, and mixtures thereof. For example, the solution can include zinc halide, such as zinc bromide or zinc chloride or both, optionally in combination with calcium bromide or calcium chloride or both. The brine solution can include the salts in conventional amounts, generally ranging from about 1% to about 80%, and preferably from about 20% to about 60%, based on the total weight of the solution, although as the skilled artisan will appreciate, amounts outside of this range can be used as well.

Particularly preferred for use in the present invention are solutions that include one or more halides of zinc and one or more halides of calcium, and more preferably zinc bromide, with or without zinc chloride, and calcium bromide, with or without calcium chloride. Such solutions can include about 5 to about 40 percent by weight zinc bromide; about 30 to about 60 percent by weight calcium bromide; about 0 to about 22 percent by weight zinc chloride and/or calcium chloride; and remainder water. For reference to exemplary solutions useful in oil and gas well drilling applications, and particularly deep high temperature and high pressure wells, see U.S. Pat. Nos. 4,980,074, 4,304,677 and 4,292,183, the entire disclosure of each of which is hereby incorporated in its entirety by reference.

Other solutions useful in the present invention for oil and gas well drilling applications include aqueous alkali hydroxide solutions, such as aqueous solutions of sodium hydroxide. Such solutions typically include the alkali hydroxide in an amount ranging from about 10 to about 80% by weight, and preferably from about 30 to about 60% by weight, although amounts outside of this range may also be useful.

The heteropoly complex anions of transition metal elements can be generally described as coordination-type salts and free acids with a complex and high molecular weight anion. The heteropoly complex anions include as a ligand or complexing agent at least one transition metal atom which, as an ion in solution, exhibits corrosion inhibiting properties in oil and gas drilling systems. The heteropoly complex anions useful in the solutions of the invention also are preferably substantially completely soluble in brine solutions, so as to maximize the concentration of the corrosion inhibiting ions in solution. The heteropoly anions contain complexed transition metal atoms (such as Mo). Therefore, the dissolved heteropoly anions can provide a higher level of transition metal anions (Mo anions) in a solution, as compared to simple transition metal oxides, such as molybdates like lithium molybdate.

Any of the heteropoly complex anions known in the art can be used in the invention, including compounds described in U.S. patent application Ser. No. 08/876,126, filed Jun. 23, 1997, now U.S. Pat. No. 6,004,475, issued Dec. 21, 1999, the entire disclosure of which is incorporated herein by reference. Such complexes can be generally represented by the following formulas:

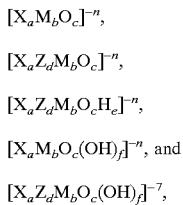

$[X_aM_bO_c]^{-n}$, $[X_aZ_dM_bO_c]^{-n}$, $[X_aZ_dM_bO_cH_e]^{-n}$, $[X_aM_bO_c(OH)_f]^{-n}$, and $[X_aZ_dM_bO_c(OH)_f]^{-7}$, wherein:

X and Z are central heteroatoms from Groups I–VIII of the Periodic Table of Elements;

the value of a varies and is 1 or 2;

the value of d varies and is an integer from 0 to 4;

$M_bO_c$, $M_bO_cH_e$, and $M_bO_c(OH)_f$ are oxoanions in which M is a transition metal element; the value of b varies, depending upon the number of transition metal atoms present in the oxoanion and can be an integer from 5 to 22, preferably 6 to 12; the value of c varies, depending upon the number of oxygen atoms present in the oxoanion attached to the transition metal and also capable of forming unique structural groups with the central atoms, and is an integer from 20 to 70, preferably from 24 to 40; the value of e varies (for example in the reduced heteropolyanion, the value of e varies depending upon the reduction of the heteropolyanion) and is an integer from 0 to 6; and the value of f varies and is an integer from 0 to 3; and n is the charge of the anion and is the sum of the charges on X, Z, M, O, H, and OH.

Although the above formulas are general representations of the heteropoly complex anions useful in the invention, as will be appreciated by the skilled artisan, other compounds can also be included. Also as these formulas represent, in some heteropoly complex anions, H atoms in addition to the 0 atoms have been reported. Any of the various heteropoly complex anions known in the art can be used in the invention, including compounds described by G. A. Tsigdinos, Topics Curr. Chem., vol. 76, 5–64 (1978) and D. L. Kepert, Comprehensive Inorganic Chemistry (A. F. Trofman et al.) Oxford:Pergamon Press, vol. 4, pp. 607 (1973), the entire disclosure of each of which is incorporated herein by reference.

With regard to the central or heteroatom X, over 40 different elements (both metals and nonmetals) from Periodic Groups I–VIII can function as central atoms in distinct heteropoly complex anions. For example, X can be an elements selected from Groups IVB, VB, VIB, VIIB, VIII, IB, IIB, IIIA, IVA, and VA of the Periodic Table of Elements. Exemplary central atoms include, but are not limited to, ions of phosphorus, silicon, manganese, arsenic, boron, iron, tellurium, copper, zinc, aluminum, tin, zirconium, titanium, vanadium, antimony, bismuth, chromium, gallium, germanium, and the like.

M is a 2–18 hexavalent transition metal element atom, which surrounds one or more central atoms X. The transition metal atom M is selected from those elements which as ions in solution provide corrosion inhibiting effect in oil and gas drilling systems. Preferably the transition metal element M in the oxoanion is derived from molybdate or tungstate. Other transition metal elements can also be present, as represented in the formula as Z, such as but not limited to, an element selected from Groups IVB, VB, VIB, VIIB, VIII, IB, IIB, IIIA, IVA, and VA of the Periodic Table of Elements.

Exemplary elements include without limitation manganese, cobalt, nickel, copper, zinc, vanadium, niobium, tantalum, gallium, germanium, arsenic, antimony, bismuth, tellurium, and the like and other transition elements.

Exemplary heteropoly complex anions include, but are not limited to, phosphomolybdates, such as but not limited to, $[PMo_{12}O_{40}]^{-3}$, wherein $P^{+5}$ is the central atom or heteroatom, $[PMo_{10}V_2O_{40}]^{-5}$ and the like; silicon molybdates, such as but not limited to, $[SiMo_{11}NiO_{40}H_2]^{-6}$, wherein $Si^{+4}$ is the central atom; manganese molybdates, such as but not limited to, $[MnMo_9O_{32}]^{-6}$, wherein $Mn^{+4}$ is the central atom; silicon tungstates, such as but not limited to, $[SiW_{12}O_{40}]^{-4}$, wherein Si+4 is the central atom; tellurium molybdates, such as but not limited to, $[TeMo_6O_{24}]^{-6}$, wherein $Te^{+6}$ is the central atom; arsenic molybdates, such as but not limited to, $[As_2Mo_{18}O_{62}]^{-6}$, wherein $As^{+5}$ is the central atom; manganese niobiates, such as but not limited to, $[MnNb12O_{36}]^{-12}$, wherein $Mn^{+4}$ is the central atom; and the like, and mixtures thereof. Currently preferred heteropoly complex anions are phosphomolybdates.

The heteropoly complex anions which have been structurally characterized can be divided into the broad groups, depending upon the heteroatom [X], transition metal atom [M] stoichiometry, and upon the coordination number of the heteroatom (that is, the number of points at which M is attached to the heteroatom in the complex). The heteropoly complex anions can be classified according to the ratio of the number of the central atoms to the peripheral molybdenum or other such atoms. For example, the different types of known heteropoly complex anions of molybdate show the following X:M ratio with one or more central atoms: X:M= 1:12, 1:11, 1:10, 1:9, 1:6, 2:10, 2:17, 2:5, 4:12, 1 m:6 m (m unknown) and 1:1 heteropoly complex anions. The known tungstates include all of the above in addition to 2:18, 2:17 and 2:4:18.

In a preferred embodiment of the invention, the transition metal of the heteropoly complex anion is molybdenum or tungsten, and more preferably, molybdenum. A particularly preferred solution includes the heteropoly complex anion $[PMo_{12}O_{30}]^{-3}$.

The solutions of the invention can also include one or more additional corrosion inhibiting additives or agents in combination with the heteropoly complex anion. For example, the solution can include another transition metal additive having corrosion inhibiting properties. Generally the corrosion inhibiting transition metal additive is a transition metal salt that is different from the transition metal salts such as the zinc halides described above. Useful transition metal additives having corrosion inhibiting properties include compounds capable of providing the transition metal element as ions in aqueous brine solutions for complexing with the chosen heteropoly anion. The transition metal element of the transition metal additive can be the same or different from the transition metal of the heteropoly anion complex. Exemplary transition metal additives include nitrates, halides, oxides, and the like, preferably halides, of transition metal elements such as cobalt, nickel, tungsten, zirconium, manganese, chromium, and the like. The solutions of the invention can also include mixtures of such corrosion inhibiting transition metal additives. See U.S. Pat. No. 6,004,476, issued Dec. 21, 1999, the entire disclosure of which is hereby incorporated by reference.

Other additional corrosion inhibiting additives useful alone or in combination with the heteropoly complex anion include corrosion inhibiting compounds of the metallic elements of Groups IIIa to VIa of the Periodic Table of Elements. Such compounds are also selected from compounds capable of providing the metallic elements of Group IIIa to VIa as ions in brine solutions. Exemplary compounds of the metallic elements of Groups IIIa to VIa include oxides, sulfides, halides, nitrates, and the like, preferably halides, of metallic elements of Group IIIa to VIa, such as antimony, germanium, and the like. See U.S. Pat. No. 6,004,476, noted above.

U.S. Pat. No. 6,033,595, issued Mar. 7, 2000, the entire disclosure of which is hereby incorporated by reference, describes halides of metallic elements of Group Va of the Periodic Table of Elements which can be particularly useful in the invention. Exemplary halides of Group Va metallic elements (i.e., arsenic, antimony, and bismuth) include antimony bromide, arsenic bromide, and bismuth bromide, and the like and mixtures thereof. Other halides can also be useful, such as chloride or iodide, although bromides are currently preferred.

The heteropoly complex anions, transition metal additives, compounds of metallic elements of Groups IIIa to VIa, including compounds of the Group Va metallic elements, are present in the compositions of the invention in amounts sufficient to provide the desired corrosion inhibiting effect. This amount can vary depending upon various factors, such as the solubility of the compounds in the brine solution, the nature of the ions, temperatures in the oil well or other similar application, concentration of brine in aqueous brine solution, metals used in the construction of the oil well, the presence of air, and the like. Preferably, the aqueous brine solutions of the invention include at least one heteropoly complex anion in an amount ranging from about 50 parts per million (ppm) to about 5000 ppm, more preferably about 50 ppm to about 500 ppm. Transition metal compounds or compounds of the metallic elements of Group IIIa to VIa can be present in the solutions in amounts ranging from about 10 parts per million (ppm) to about 200 ppm. However, compounds of the metallic elements of Group Va can be present in an amount ranging from about 50 parts per million (ppm) to about 5000 ppm. The corrosion inhibiting agents can also be useful in amounts outside of these ranges, so long as the agent is present in an amount sufficient to provide corrosion inhibition properties.

Further, the solution can include other corrosion inhibitors, such as but not limited to lithium nitrate, molybdate and/or chromate in conventional amounts. Other agents conventionally found in completion fluids can also be present such as but not limited to bactericides, scale preventives, algaecides, emulsifiers, demulsifiers, water and other solvents or diluents, e.g., hydrocarbons, alcohols, and the like.

The present invention also provides processes for inhibiting corrosion of metals, particularly in oil and gas well drilling, production and storage systems, resulting from the presence of one or more metallic salts, such as zinc halide. The solutions of the invention find particular application for the protection of metal equipment, pipes, tubing, and the like of oil and gas wells.

In the process of the invention, the above described corrosion inhibiting additives singly or in combination are fed or circulated in the oil or gas well to contact the walls of casings, tubing, and other well components such as wellhead fittings, connections, meters, storage tanks, flow lines handling the corrosive fluid, and other metallic elements employed therein. The additive(s) can be added to the oil or gas drilling system by adding the corrosion inhibitors to brine solutions, which are then employed in the oil and gas drilling system under conditions and in amounts sufficient to provide a corrosion inhibiting effect. As the skilled artisan will appreciate, the environment or conditions, such as temperature and/or pressure, can vary. Typically, the temperatures can be as high as 550° F., and higher. The additives, in brine solutions, are particularly advantageous for high temperature applications.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A solution having corrosion inhibiting properties useful in oil and gas well drilling systems, the solution comprising:
   an aqueous solution comprising at least one zinc halide, at least one alkaline earth metal salt, or a mixture thereof; and
   at least one heteropoly complex anion of a transition metal element present in an amount sufficient to provide a corrosion inhibiting effect.

2. The solution of claim 1, wherein said alkaline earth metal salt comprises one or more calcium halides.

3. The solution of claim 1, wherein said solution comprises at least one zinc halide and at least one calcium halide.

4. The solution of claim 3, wherein said solution comprises zinc bromide, optionally zinc chloride, calcium bromide, and optionally calcium chloride.

5. The solution of claim 1, said solution further comprising at least one additional corrosion inhibiting additive in an amount sufficient to provide a corrosion inhibiting effect.

6. The solution of claim 1, wherein said at least one heteropoly complex anion comprises a compound selected from the group consisting of $[X_aM_bO_c]^{-n}$, $[X_aZ_dM_bO_c]^{-n}$, $[X_aZ_dM_bO_cH_e]^{-n}$, $[X_aM_bO_c(OH)_f]^{-n}$, $[X_aZ_dM_bO_c(OH)_f]^{-n}$, and mixtures thereof, wherein:
   X and Z are central heteroatoms selected from the group consisting of elements from Groups I–VIII of the Periodic Table of Elements;
   a is 1 or 2;
   d is an integer from 0 to 4;
   $M_bO_c$, $M_bO_cH_e$, and $M_bO_c(OH)_f$ are oxoanions in which M is a transition metal element; b is an integer from 5 to 22; c is an integer from 20 to 70; e is an integer from 0 to 6; and f is an integer from 0 to 3; and
   n is the charge of the anion.

7. The solution of claim 6, wherein:
   X is phosphorus, silicon, manganese, tellurium or arsenic; and
   M is molybdenum or tungsten.

8. The solution of claim 1, wherein said at least one heteropoly complex anion is selected from the group consisting of phosphomolybdates, silicon molybdates, manganese molybdates, silicon tungstates, tellurium molybdates, arsenic molybdates, and mixtures thereof.

9. The solution of claim 1, wherein said at least one heteropoly complex anion comprises a phosphomolybdate of the formula $[PMo_{12}O_{40}]^{-3}$.

10. The solution of claim 5, wherein said additional corrosion inhibiting additive comprises at least one transition metal compound which is different from said at least one zinc halide and from said heteropoly complex anion of a transition metal element.

11. The solution of claim 10, wherein said additional corrosion inhibiting additive comprises a transition metal which is different from the transition metal of the heteropoly complex anion.

12. The solution of claim 10, wherein said additional corrosion inhibiting additive is selected from the group consisting of nitrates, halides, and oxides of transition metal elements, and mixtures thereof.

13. The solution of claim 12, wherein said transition metal elements are selected from the group consisting of cobalt, nickel, tungsten, zirconium, manganese, chromium, and mixtures thereof.

14. The solution of claim 5, wherein said additional corrosion inhibiting additive comprises at least one compound of the metallic elements of Groups IIa to VIa of the Periodic Table of Elements.

15. The solution of claim 14, wherein said additional corrosion inhibiting additive is selected from the group consisting of oxides, sulfides, halides, nitrates, and mixtures thereof of metallic elements of Group IIIa to VIa.

16. The solution of claim 15, wherein said additional corrosion inhibiting additive is a halide of a metallic element of Groups IIIa to VIa.

17. The solution of claim 16, wherein said halide is selected from the group consisting of antimony bromide, germanium bromide, arsenic bromide, bismuth bromide, and mixtures thereof.

18. The solution of claim 14, wherein said additional corrosion inhibiting additive comprises antimony as the metallic element of Groups IIIa to VIa.

19. The solution of claim 1, wherein said solution comprises said at least one zinc halide, said at least one alkaline earth metal salt or mixture thereof in an amount from about 1 to about 80 weight percent, based on the total weight of the solution.

20. The solution of claim 19, wherein said solution comprises said at least one zinc halide, said at least one alkaline earth metal salt or mixture thereof in an amount from about 20 to about 60 weight percent, based on the total weight of the solution.

21. A solution having corrosion inhibiting properties useful in oil and gas well drilling systems, the solution comprising:
   at least one salt selected from the group consisting of first transition metal salts, alkaline earth metal salts, and mixtures thereof;
   at least one heteropoly complex anion of a transition metal element; and
   at least one additional corrosion inhibiting agent selected from the group consisting of transition metal salts which are different from said first transition metal salts, salts of the metallic elements of Groups IIIa to VIa of the Periodic Table of Elements, and mixtures thereof, said heteropoly complex anion and said additional additive present in an amount sufficient to provide a corrosion inhibiting effect.

22. The solution of claim 21, wherein said first transition metal salt comprises one or more zinc halides.

23. The solution of claim 21, wherein said alkaline earth metal salt comprises one or more calcium halides.

24. The solution of claim 21, wherein said solution comprises at least one zinc halide and at least one calcium halide.

25. The solution of claim 24, wherein said solution comprises zinc bromide, optionally zinc chloride, calcium bromide, and optionally calcium chloride.

26. The solution of claim 21, wherein said heteropoly complex anion comprises a phosphomolybdate, and said additional additive comprises at least one transition metal salt.

27. The solution of claim 26, wherein said additional additive comprises at least one halide of cobalt, nickel, tungsten, zirconium, manganese, chromium, and mixtures thereof.

28. The solution of claim 21, wherein said heteropoly complex anion comprises a phosphomolybdate and said additional additive comprises at least one salt of a metallic element of Group IIIa to VIa.

29. The solution of claim 28, wherein said additional additive comprises a halide of the metallic elements of Group Va of the Periodic Table of Elements.

30. The solution of claim 29, wherein said additional additive comprises a compound selected from the group consisting of antimony bromide (SbBr$_3$), arsenic bromide, bismuth bromide and mixtures thereof.

31. The solution of claim 21, wherein said heteropoly complex anion is $[PMo_{12}O_{40}]^{-3}$.

32. The solution of claim 21, wherein said first transition metal salts, alkaline earth metal salts, and mixtures thereof are present in an amount from about 20 to about 60 weight percent, based on the total weight of the solution.

33. An aqueous completion fluid for oil and gas well drilling systems having corrosion inhibiting properties, comprising at least one zinc halide, at least one calcium halide, or a mixture thereof; at least one phosphomolybdate; and at least one halide of the metallic elements of Group Va of the Periodic Table of Elements, said phosphomolybdate and said Group Va halide present in an amount sufficient to provide a corrosion inhibiting effect.

34. The aqueous completion fluid of claim 33, wherein said phosphomolybdate is $[PMo_{12}O_{40}]^{-3}$, and said Group Va halide is antimony bromide (SbBr$_3$).

35. The aqueous completion fluid of claim 34, wherein said solution comprises zinc bromide, optionally zinc chloride, calcium bromide, and optionally calcium chloride.

* * * * *

UNITED STATES PATENT AND TRADEMARK OFFICE
CERTIFICATE OF CORRECTION

PATENT NO. : 6,620,341 B1
DATED : September 16, 2003
INVENTOR(S) : Verma et al.

It is certified that error appears in the above-identified patent and that said Letters Patent is hereby corrected as shown below:

Column 5,
Line 40, should read -- $[PMo_{12}O_{40}]^{-3}$ --

Column 7,
Line 20, should read -- least one alkaline earth metal salt; --
Line 39, should read -- $^n$, and mixtures thereof, wherein: --

Column 8,
Line 14, should read -- pound of the metallic elements of Groups IIIa to VIa of the --

Signed and Sealed this

Thirteenth Day of July, 2004

JON W. DUDAS
*Acting Director of the United States Patent and Trademark Office*